United States Patent Office 3,563,092
Patented Feb. 16, 1971

3,563,092
THERMOMETER
Vilho Vaisala, Mantytie 5A, Helsinki, Finland
Filed May 19, 1969, Ser. No. 825,672
Claims priority, application Finland, May 24, 1968,
1,455/68
Int. Cl. G01k 5/52
U.S. Cl. 73—363.1                                    2 Claims

ABSTRACT OF THE DISCLOSURE

A thermometer which measures electrocapacitively or electroinductively and is particularly intended for use in radiosondes is particularly characterized by a body member which is U-shaped and which consists of transparent profiled glass material, preferably quartz glass. A measuring metal wire extends within the body member and has an end connected by an extension wire to an adjustment device carried by the central portion of the U-shaped body member. The other end of the measuring wire is connected by another extension wire to a spring carried by the ends of the two legs of the U-shaped body member.

---

The present invention concerns an electrocapacitively or electroinductively measuring thermometer which is especially intended for use in radiosondes and in which as measuring element a metal wire with good thermal expansion coefficient is used.

In radiosondes which measure temperature by capacitive or inductive means it has been general practice to use a comparatively massive bimetallic measuring element. As a result of their massivity, these previously known measuring elements have had two very significant drawbacks, namely, sluggishness and unreliability of the results of measurement induced by solar radiation.

One of the objects of the present invention was to eliminate the said drawbacks and to accomplish a thermometer which is lighter in weight than the conventional structures belonging to previous art and also structurally of such simplicity that the manufacturing costs of the device can be made low.

A thermometer according to the invention is mainly characterized in that the thermometer comprises a body part made of a material well permeable to solar radiation and possessing the smallest possible thermal expansion, to which body part the metal wire acting as measuring element has been affixed by its both ends by means of an extension wire with low thermal expansion coefficient, and that attachment of one of the extension wires to the said body part has been accomplished with the aid of a device acting as a spring such that it keeps the metal wire serving as measuring element tautly stretched.

The invention is described in the following in closer detail with reference to the attached drawing and to an embodiment of the invention presented in this drawing.

Figure 1:
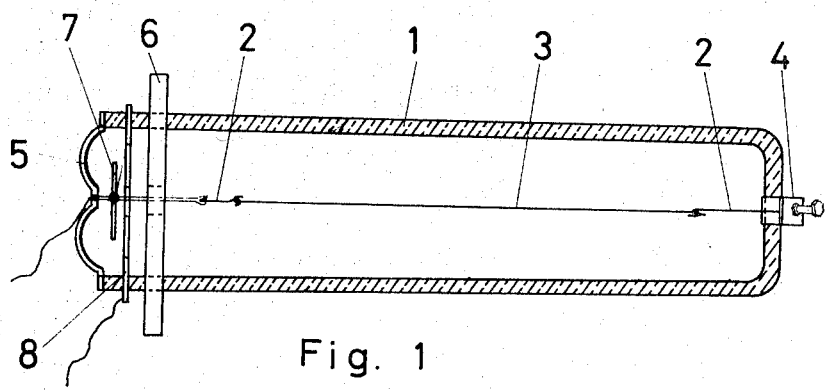
Figure 2:
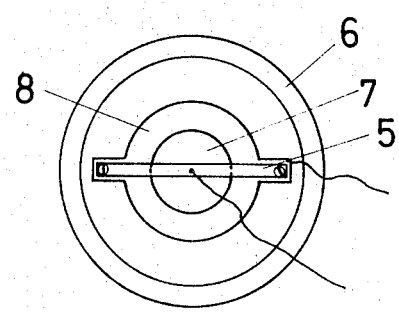
Figure 3:
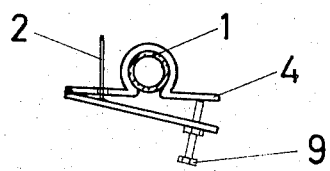

FIG. 1 presents an electrocapacitively operating thermometer in elevational view. FIG. 2 shows the same instrument, seen from one end. FIG. 3 shows an enlarged detail of the adjustment device incorporated in the thermometer.

In the thermometer depicted in the drawing, there has been used as measuring element a comparatively thin and bright metal wire, e.g., a duraluminium wire 3 which is 0.15 mm. in diameter, the longitudinal expansion of which, as a function of temperature, is used for measurement of temperature. The mass of this element is only a small fraction of that of the bimetal elements nowadays used, e.g., in radiosondes, whence follows that the drawbacks introduced by the inertia and heat absorption of the latter have been virtually eliminated.

The metal wire 3 used as measuring element has been attached to a body part 1 made of glass with good permeability in respect of solar radiation, and which advantageously consists of quartz glass, whereby the thermal expansion movement of the body part and its heating by effect of absorption of the sun's thermal radiation are of an insignificant order of magnitude. The metal wire 3 is not directly affixed to the body part 1, but between them extension wires 2 have been used which should have a small thermal expansion coefficient and, advantageously, also poor thermal conductivity. Well appropriate for this purpose is, for instance, so-called Invar wire. By means of this design, transfer of heat from the rest of the structure to the wire 3 used as measuring element is efficiently prevented.

At one end, the thermometer has a plate 6 keeping the body part in shape and belonging to it, and on the outside of the plate, two condenser plates 7 and 8. Furthermore, at the same end there is a spring device 5, which keeps the wire 3 used as measuring element tautly stretched. Changes of the length of the measuring element wire 3 as a function of temperature cause the distance of the condenser plate 7 with reference to the stationary plate 8 to change, and the change in electrical capacitance thus produced can be calibrated to indicate temperature. Instead of the condenser plates 7 and 8, it is possible in a thermometer according to the invention to use, in a manner previously known in itself, also the electroinductive principle of measurement.

One end of the measuring element wire 3 has been attached by means of the extension wire 2 to a simple adjustment device 4, which has been attached to one end of the body part 1 having the shape of a U bow, as has been more clearly shown in FIG. 3. Adjustment is accomplished by turning the screw 9, whereby, depending on the direction in which the screw is turned, the condenser plate 7 moves either closer to the condenser plate 8 or moves away from it.

A thermometer according to the invention is especially intended for use in radiosondes, but it is naturally also suitable for use in other applications. It is also to be noted that the invention is not in any way narrowly confined to the design example shown in the drawing either; on the contrary, the design of the thermometer may be modified in various details within the scope of the inventive idea.

What is claimed is:

1. An electrocapacitively or electroinductively measuring thermometer for radiosondes and the like, comprising, in combination, a U-shaped body part consisting of transparent profiled glass material, a metal wire constituting the measuring element and extending within said U-shaped body part parallel to the legs thereof, an adjustment device carried by the central portion of said U-shaped body part, an extension wire connecting one end of said measuring element to said adjustment device, a spring mounted upon the ends of the two legs of said U-shaped body part, and another extension wire connecting the opposite end of said measuring element to said spring.

2. Thermometer according to claim 1, characterized in that the body part has been made of quartz glass.

References Cited

UNITED STATES PATENTS

| | | | |
|---|---|---|---|
| 1,940,300 | 12/1933 | Gerdien et al. | 73—362.3X |
| 1,951,276 | 3/1934 | Edwards et al. | 73—362 |
| 1,961,282 | 6/1934 | Dallenbach | 73—363.1X |
| 2,025,719 | 12/1935 | Blau et al. | 73—362UX |
| 2,315,277 | 3/1943 | Shaw | 73—170X |
| 2,685,562 | 8/1954 | Trefry | 73—362.3X |

LOUIS R. PRINCE, Primary Examiner

D. M. YASICH, Assistant Examiner